(12) United States Patent
Kwon et al.

(10) Patent No.: US 9,660,281 B2
(45) Date of Patent: May 23, 2017

(54) METHOD FOR CONTROLLING STARTUP OF FUEL CELL SYSTEM

(71) Applicants: Hyundai Motor Company, Seoul (KR); Kia Motors Corporation, Seoul (KR)

(72) Inventors: Sang Uk Kwon, Suwon-si (KR); Soon Il Jeon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 345 days.

(21) Appl. No.: 14/460,076

(22) Filed: Aug. 14, 2014

(65) Prior Publication Data

US 2015/0180067 A1 Jun. 25, 2015

(30) Foreign Application Priority Data

Dec. 23, 2013 (KR) ........................ 10-2013-0161877

(51) Int. Cl.
*H01M 8/04* (2016.01)
*H01M 8/04537* (2016.01)
(Continued)

(52) U.S. Cl.
CPC ..... *H01M 8/04559* (2013.01); *H01M 8/0432* (2013.01); *H01M 8/0444* (2013.01);
(Continued)

(58) Field of Classification Search
CPC ......... H01M 8/04302; H01M 8/04313; H01M 8/0432; H01M 8/0438; H01M 8/04388;
(Continued)

(56) References Cited

U.S. PATENT DOCUMENTS

2002/0076582 A1* 6/2002 Reiser ............... H01M 8/04223
429/429
2003/0072984 A1* 4/2003 Saloka ............... H01M 8/04014
429/429
(Continued)

FOREIGN PATENT DOCUMENTS

JP 2005-515603 A 5/2005
JP 2008-010188 A 1/2008
(Continued)

OTHER PUBLICATIONS

Korean Office Action dated Nov. 28, 2014, Issued in corresponding Korean Patent Application No. 10-2013-0161877. (5 pgs).

*Primary Examiner* — Patrick Ryan
*Assistant Examiner* — Julian Anthony
(74) *Attorney, Agent, or Firm* — McDermott Will & Emery LLP

(57) ABSTRACT

A method for controlling a startup of a fuel cell system is provided. The method includes comparing a voltage generated in a fuel cell stack when hydrogen is supplied to a fuel electrode of the fuel cell stack for a set period of time with a first reference voltage. A voltage of a unit cell of the fuel cell stack is compared with a second reference voltage for load connection when the voltage generated in the fuel cell stack is higher than the first reference voltage. A load is connected to the fuel cell stack when the voltage of the unit cell of the fuel cell stack is higher than the second reference voltage for load connection.

22 Claims, 2 Drawing Sheets

(51) Int. Cl.
*H01M 8/0432* (2016.01)
*H01M 8/0444* (2016.01)
*H01M 8/04746* (2016.01)

(52) U.S. Cl.
CPC ... *H01M 8/04552* (2013.01); *H01M 8/04753* (2013.01); *H01M 8/04761* (2013.01); *H01M 2250/20* (2013.01); *Y02T 90/32* (2013.01)

(58) Field of Classification Search
CPC ......... H01M 8/04537; H01M 8/04544; H01M 8/04552
USPC .................................................. 429/429, 432
See application file for complete search history.

(56) References Cited

U.S. PATENT DOCUMENTS

| | | | | |
|---|---|---|---|---|
| 2006/0083963 | A1* | 4/2006 | Margiott | H01M 8/04201 429/415 |
| 2007/0042235 | A1* | 2/2007 | Kagami | H01M 8/04007 429/429 |
| 2012/0276460 | A1* | 11/2012 | Kumei | H01M 8/04104 429/410 |

FOREIGN PATENT DOCUMENTS

| | | |
|---|---|---|
| JP | 2008-192614 A | 8/2008 |
| KR | 10-2008-0112475 A | 12/2008 |
| KR | 10-2009-0111241 A | 10/2009 |

\* cited by examiner

METHOD FOR CONTROLLING STARTUP OF FUEL CELL SYSTEM

CROSS-REFERENCE(S) TO RELATED APPLICATION

The present application claims the benefit of priority to Korean Patent Application Number 10-2013-0161877 filed on Dec. 23, 2013, the entire contents of which application is incorporated herein for all purposes by this reference.

TECHNICAL FIELD

The present disclosure relates to a method for controlling a startup of a fuel cell system, and more particularly, to a method for controlling a startup of a fuel cell system, which can remove residual oxygen remaining on a fuel electrode to improve durability of the fuel cell system.

BACKGROUND

A fuel cell vehicle includes a fuel cell stack in which a plurality of individual fuel cells is stacked, a fuel supply system to supply hydrogen, etc., serving as fuel to the fuel cell stack. An air supply stem supplies oxygen serving as an oxidant to create an electrochemical reaction. A water and heat management system controls a temperature of the fuel cell stack. The fuel supply system supplies the hydrogen to a fuel electrode (anode) of the fuel cell stack by reducing a pressure of compressed hydrogen stored in a hydrogen tank, and the air supply system supplies external air to an air electrode (cathode) of the fuel cell stack by using an air blower.

When oxygen is supplied to the fuel electrode of the fuel cell stack and the air is supplied to the air electrode, hydrogen ions are generated through a catalytic reaction on the fuel electrode. The generated hydrogen ions migrate through an electrolyte membrane and reach the air electrode as an oxidation electrode. In the oxidation electrode, the hydrogen ions create the electrochemical reaction with electrons and oxygen, which produces energy. To be more specific, an electrochemical oxidation reaction with the hydrogen occurs on the fuel electrode, and an electrochemical reduction reaction with the oxygen occurs on the air electrode. At this time, electricity and heat are produced due to movement of the electrons and vapor, or water is produced through the chemical reaction between the hydrogen and the oxygen.

The fuel cell vehicle further includes a discharging apparatus that discharges byproducts, such as vapor, water, and heat generated during the production of energy, and unused gases such as hydrogen and oxygen. The vapor and gases such as the hydrogen and oxygen are discharged through an exhaust duct.

However, if a voltage develops in a state where the oxygen remains on the fuel cell electrode, carbon corrosion occurs in a catalyst layer of a membrane electrode assembly (MEM), deteriorating durability of the fuel cell stack.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. The present disclosure is intended to propose a method for controlling a startup of a fuel cell system, which can detect residual hydrogen or oxygen remaining in the fuel cell system and variably control a startup sequence.

According to an exemplary embodiment of the present disclosure, a method for controlling a startup of a fuel cell system is provided. The method includes comparing a voltage generated in a fuel cell stack when hydrogen is supplied to a fuel electrode of the fuel cell stack for a set period of time, with a first reference voltage. A voltage generated in a unit cell of the fuel cell stack is compared with a second reference voltage for load connection when the voltage generated in the fuel cell stack is higher than the first reference voltage. A load is connected to the fuel cell stack when the voltage of the unit cell of the fuel cell stack is higher than the second reference voltage for load connection.

The method may further include determining an amount of oxygen to be removed from the fuel electrode or a time needed to remove the oxygen from the fuel electrode when the voltage generated in the fuel cell stack is higher than the first reference voltage. Hydrogen supercharging may be performed with respect to the fuel electrode according to the amount of the oxygen to be removed or the time needed to remove the oxygen.

The step of connecting the load may be performed when the voltage, which is generated in the unit cell of the fuel cell stack through the hydrogen supercharging, is higher than the second reference voltage for load connection.

The amount of the oxygen to be removed or the time needed to remove the oxygen may be proportional to the voltage generated in the fuel cell stack.

The method may further include a step of opening an air cut valve connected to an air electrode of the fuel cell stack, the opening being performed before the step of performing the hydrogen supercharging.

The method may further include determining whether the oxygen supplied to the fuel electrode is completely removed through the hydrogen supercharging. When the oxygen is completely removed, the hydrogen supercharging is stopped, the connection of the load is released, and air to an air electrode of the fuel cell stack is supplied.

In the step of determining, the determination may be made based on whether an amount of emissions from the fuel electrode exceeds the determined amount of the oxygen to be removed or whether a time for which the hydrogen supercharging is performed exceeds the determined time needed to remove the oxygen.

The method may further include a step of comparing an elapsed time from a completion of last supply of the hydrogen to the fuel cell stack, with a reference time which is preset, wherein the step of comparing the voltage generated in the fuel cell stack with the first reference voltage is performed when the elapsed time from the completion of the last supply of the hydrogen is longer than the reference time.

The method may further include a step of opening an air cut valve connected to an air electrode of the fuel cell stack and supplying hydrogen and air to the fuel cell stack, when the elapsed time from the completion of the last supply of the hydrogen is shorter than the reference time.

The elapsed time from the completion of the last supply of the hydrogen may be a time which is elapsed from turning-off of an ignition key of a fuel cell vehicle.

The elapsed time from the completion of the last supply of the hydrogen may be a time elapsed from a last supply of hydrogen when the hydrogen is periodically supplied after turning-off of an ignition key of a fuel cell vehicle.

The method may further include determining whether a temperature of the fuel cell stack meets a cold starting condition. Hydrogen and air are supplied to the fuel cell stack by opening an air cut valve connected to an air electrode of the fuel cell stack when the temperature meets the cold starting condition.

The method may further include a step of supplying air to the fuel cell stack by opening an air cut valve connected to an air electrode of the fuel cell stack when the voltage generated in the fuel cell stack is lower than the first reference voltage.

The comparing may refer to a step of determining whether a minimum voltage among voltages generated in all unit cells of the fuel cell stack is higher than the second reference voltage for load connection.

The step of connecting may not be performed when the voltage generated in a unit cell of the fuel cell stack is lower than the second reference voltage for load connection.

The step of connecting may not be performed, when a temperature of the fuel cell stack meets a cold starting condition after the performing of the hydrogen supercharging.

The step of connecting may not be performed, when failure of a load connection device is detected and thus a load cannot be connected to the fuel cell stack.

The step of connecting may not be performed, when a supply pressure of hydrogen to the fuel electrode is lower than a reference pressure.

The method may further supply an amount of hydrogen larger than the amount of hydrogen used in the step of performing of the hydrogen supercharging to the fuel electrode of the fuel cell stack through a supercharging method, without performing the step of connecting the load.

The method for controlling a startup of a fuel cell system according to one embodiment of the present disclosure can prevent carbon corrosion which can occur in a fuel electrode or an air electrode of a fuel cell, thus improving durability of the fuel cell system.

In addition, the method can reduce hydrogen emission by adjusting an opening of an air cut valve, reduce starting time, increase fuel efficiency, and cut back noise.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Figure 1:
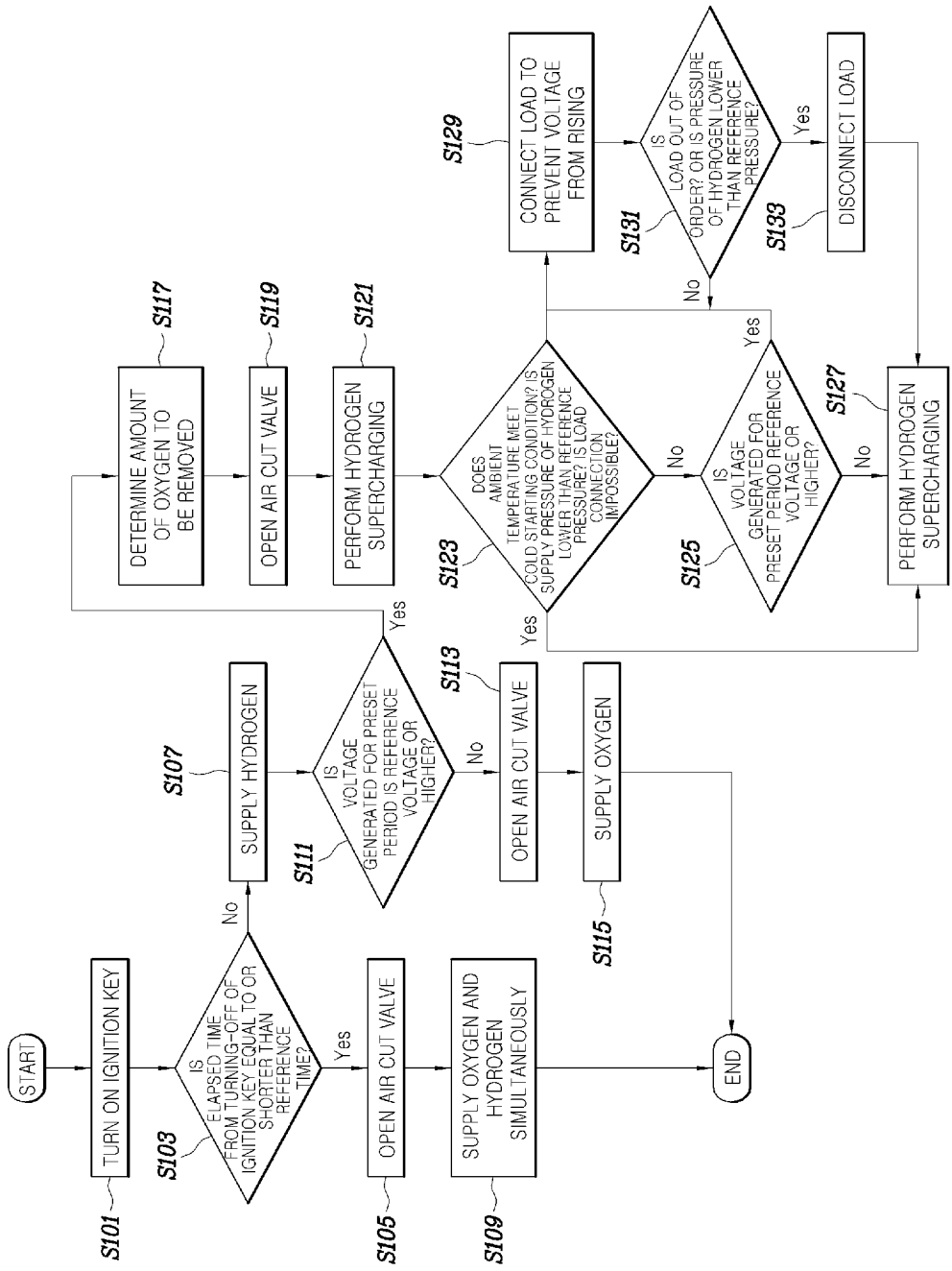
FIG. 1 is a flowchart illustrating a method for controlling a startup of a fuel cell system according to an embodiment of the present disclosure.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents, and other embodiments that may be included within the spirit and scope of the present disclosure as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present disclosure will be described in detail with reference to the accompanying drawings. Throughout the drawings, the same reference numerals will refer to the same or like parts.

FIG. 1 is a flowchart illustrating a method for controlling a startup of a fuel cell system according to an embodiment of the present disclosure. When an ignition key of a fuel cell vehicle is turned on (S101), a fuel cell controller (not shown), which controls a fuel cell, obtains an elapsed time which is taken after the last supply of hydrogen to a fuel cell stack and compares the elapsed time with a reference time which is preset (S103). Here, the elapsed time above may refer to a time which is taken after the ignition of the fuel cell vehicle is turned off or to a time which is taken from the turning-off of the ignition of the fuel cell vehicle to the last supply of hydrogen in a case where the hydrogen is periodically supplied.

When the fuel cell vehicle remains in a driving state after the ignition key is turned on, the fuel electrode of the fuel cell stack is continuously supplied with hydrogen. Accordingly, hydrogen in the fuel cell stack is completely consumed after the elapse time from the turning-off of the ignition key.

In the case of periodically supplying hydrogen to the fuel electrode after the turning-off of the ignition key in order to remove residual oxygen in the fuel cell stack, the fuel cell controller acquires the elapsed time from the supply of the hydrogen to the fuel electrode and compares the elapsed time with the reference time.

When the elapsed time from the last supply of the hydrogen to the fuel cell stack is shorter than the reference time, residual hydrogen still exists on the fuel electrode. When the residual hydrogen exists on the fuel electrode, the residual oxygen is not likely to exist on the fuel electrode. Accordingly, a special control for the fuel cell system needs not be performed, and the fuel cell controller supplies hydrogen and oxygen to the fuel cell stack in order to produce electricity (S109).

Before supplying hydrogen and oxygen to the fuel cell stack, the fuel cell controller may open an air cut value (S105) to purge the hydrogen from the fuel electrode, or preventing exhaust hydrogen discharged through a drain from being directly emitted to the atmosphere without being diluted with air. That is, in order to meet environmental regulations on hydrogen emission, hydrogen is diluted with oxygen supplied through air supply before being emitted to the atmosphere. The air cut value controls the amount of air supplied to an air electrode.

At step S103, the fuel cell controller may acquire an ambient air temperature around the vehicle from a temperature sensor and determines whether the vehicle is in a cold starting condition. A carbon corrosion reaction is not likely to occur at a low ambient temperature. Accordingly, the special control for the fuel cell system is not necessary at the low temperature. Thus, the fuel cell controller supplies hydrogen and oxygen to the fuel cell stack to produce electricity under this condition (S109). The fuel cell controller may open the air cut valve before supplying hydrogen and oxygen to the fuel stack (S105). That is, the fuel cell controller opens the air cut valve connected to the air electrode of the fuel cell stack and supplies the hydrogen and the oxygen to the fuel cell stack under the cold starting condition.

When the elapsed time after the last supply of hydrogen to the fuel cell stack is longer than the reference time, no further hydrogen exists on the fuel electrode. The reference time is an elapsed time which can guarantee a state where no hydrogen exists on the fuel electrode, and the reference time may be preset. That is, if a set period of time elapses from the turning-off of the ignition key or the supply of hydrogen, it becomes a time point at which no further hydrogen exists on the fuel electrode. This set period of time is set as the reference time.

When the vehicle is not under the cold starting condition, the fuel cell controller performs the same control which is performed when the elapsed time from the last supply of the hydrogen to the fuel cell stack is longer than the reference time.

When the elapsed time from the last supply of the hydrogen to the fuel cell stack is longer than the reference time, it is determined that no hydrogen exists on the fuel electrode. Accordingly, in this state, the fuel cell controller supplies the hydrogen to the fuel electrode of the fuel cell stack and determines whether there is residual oxygen on the fuel electrode (S107).

The determination is made based on whether a voltage of the fuel cell stack is larger than a reference voltage. That is, the fuel cell controller compares a measured voltage which is measured within a set period of time after the hydrogen is supplied to the fuel cell stack with the reference voltage (S111) and determines whether there is residual oxygen or not.

The reference voltage is a minimum voltage which can be detected when the residual oxygen exists on the fuel electrode. When residual oxygen exists on the fuel electrode, the residual oxygen may react with the supplied hydrogen, producing electricity which is detected as the voltage. The minimum voltage, which can be detected in such a condition, denotes the reference voltage. Accordingly, if the voltage measured within the set period of time from the supply of the hydrogen is higher than the reference voltage, the fuel cell control may determine that the residual oxygen exists on the fuel electrode.

If the voltage measured in the fuel cell stack is lower than the reference voltage, the fuel cell controller may supply the oxygen to the air electrode (S115). Here, the fuel cell controller may open the air cut valve (S113) before supplying the oxygen to the air electrode of the fuel cell stack to purge for the fuel electrode or to prevent the hydrogen discharged through the drain from being directly emitted to the atmosphere. That is, this operation is performed to meet environmental regulations on hydrogen emission, so that the hydrogen may not be emitted alone to the atmosphere but emitted after being diluted with oxygen.

When the voltage, which develops within the set period of time, is higher than the reference voltage, the fuel cell controller may determine an amount of oxygen to be removed from the fuel electrode or a time which will be taken for the removal of oxygen (S117). The amount of the oxygen to be removed or the time needed for the oxygen removal may be proportional to the voltage in the fuel cell stack. That is, when the voltage which develops after the supply of the hydrogen to the fuel electrode is large, the residual oxygen on the fuel electrode exists in a large amount. Accordingly, the amount of the oxygen to be removed or the time needed for the oxygen removal is increased.

The fuel cell controller may supply hydrogen to the fuel electrode in the manner of supercharging, according to the amount of oxygen to be removed or the time needed for oxygen removal (S121). The fuel cell controller may open the air cut valve before carrying out the supercharging. That is, when the voltage generated within the set period of time is higher than the reference voltage, the state means that residual oxygen exists on the fuel electrode. In this state, if the air cut valve remains closed, hydrogen and oxygen existing on the fuel electrode side are likely to flow backward. Accordingly, the air cut valve may be opened before step S121 (S119).

After the hydrogen supercharging, the fuel cell controller detects the temperature of the fuel cell stack and determines whether cold starting conditions are met or not (S123). When the cold starting conditions are met, and the load is not connected to the fuel cell stack, an amount of hydrogen larger than the supercharged hydrogen is additionally supplied to the fuel electrode of the fuel cell stack (S127). At the time of cold starting, if the load is connected to the fuel cell stack, water is produced or the fuel electrode is frozen. In this case, since it is difficult to uniformly supply the hydrogen to each cell, the load may not be connected to the fuel cell stack. Thus, even though the load is connected to the fuel cell stack, the reference cell voltage for load connection may be increased. When the load cannot be connected to the fuel cell stack (S123), the fuel cell controller may additionally supply an amount of hydrogen larger than the amount of hydrogen used for the supercharging with respect to the fuel electrode of the fuel cell stack (S127).

The fuel cell controller compares the voltage generated in the fuel cell stack after the hydrogen supercharging and a reference cell voltage for load connection (S125) and may connect a load to the fuel cell stack when the voltage generated in the fuel cell stack is higher than the reference voltage (S129).

Here, the reference cell voltage for the load connection indicates that the load needs to be connected to the fuel cell stack. That is, at above the reference voltage, a minimum cell voltage of every cell in the fuel cell stack is higher than a reference voltage value. When the every cell of the fuel cell stack is supplied with enough hydrogen, hydrogen and oxygen can react in each cell to develop voltage. That is, whether the supply of hydrogen to the fuel cell stack is sufficient or not is determined by whether each unit cell generates the minimum cell voltage or not.

That is, the state where the cell voltage generated within the set period of time is higher than a preset voltage (reference cell voltage for load connection) indicates that the supply of hydrogen to the fuel electrode is sufficient. Accordingly, the load is connected to the fuel cell stack so that a voltage rise can be prevented (S129). When the load is out of order, the load cannot be connected to the fuel cell stack, or the pressure of hydrogen is lowered (S131), the fuel cell controller disconnects the load from the fuel cell stack (S133) and supplies hydrogen to the fuel electrode in the manner of supercharging (S127).

The reference cell voltage for load connection may be determined in consideration of both hydrogen shortage or carbon corrosion. When the load connection is made fast, hydrogen shortage may occur, but carbon corrosion can be prevented. Conversely, when the load connection is made slowly, hydrogen supply may be sufficient, but carbon corrosion may occur.

If the voltage generated in each cell of the fuel cell stack does not rise for a set period of time after the supply of hydrogen, the fuel cell controller may not allow the load connection to the fuel cell stack. When the cell voltage generated within the set period of time is lower than a preset voltage (reverence cell voltage for load connection), the supply of hydrogen to the fuel electrode is in shortage. Accordingly, in this case, the fuel cell controller supplies the hydrogen to the fuel electrode in the manner of supercharging (S127).

When the pressure of the hydrogen supplied to the fuel electrode is lower than a predetermined pressure value (S131) so that the hydrogen cannot be supplied to all cells of the fuel cell stack, the fuel cell stack may supply an amount of hydrogen larger than the amount of hydrogen used for the supercharging with respect to the fuel electrode of the fuel cell stack (S127).

Figure 2:
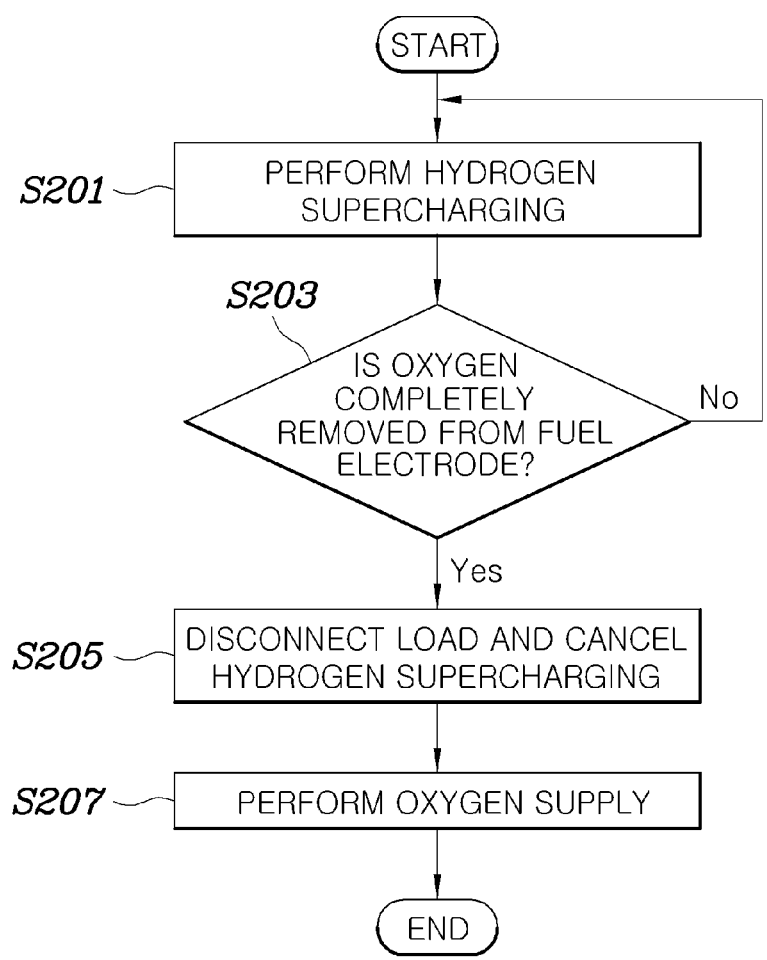
FIG. 2 is a flowchart briefly illustrating a method for controlling the method for controlling a startup of a fuel cell system according to an embodiment of the present disclosure.

FIG. 2 is a flowchart briefly describing the method for controlling a startup of a fuel cell system according to an embodiment of the present disclosure. The fuel cell system performs hydrogen supercharging with respect to the fuel cell stack (S201) and determines whether the entire residual oxygen which is likely to exist on the fuel electrode is totally removed (S203). The system disconnects the load from the fuel cell stack when it is determined that the residual oxygen is completely removed, and cancels the hydrogen supercharging operation with respect to the fuel electrode (S205). Since the entire residual oxygen is removed from the fuel electrode, the fuel cell controller can supply air to the air electrode (S207).

The supercharging of hydrogen to the fuel electrode (S201) may refer to steps S121 and S127 illustrated in FIG. 1. FIG. 2 is a flowchart illustrating only the steps subsequent to the supercharging (S121) or the additional supercharging (S127) of the steps illustrated in FIG. 1.

The time needed to remove oxygen supplied to the fuel electrode varies depending on the voltage generated in the fuel cell stack, and the determination about success of complete removal of hydrogen remaining on the fuel electrode is made based on a hydrogen supply time or an amount of emissions from the fuel electrode. For example, the amount of emissions is measured using a differential pressure or an open time of a valve.

The fuel cell controller determines whether the oxygen supplied to the fuel electrode is completely removed through the hydrogen supercharging performed in step S127 (S203). The controller stops the hydrogen supercharging and supplies air to the air electrode of the fuel cell stack when it is determined that the oxygen is completely removed. The time needed to remove oxygen supplied to the fuel electrode may vary depending on the voltage generated in the fuel cell stack. The determination about success of the complete removal of oxygen can be made based on the amount of the oxygen to be removed, the total hydrogen supply time, and the amount of emissions from the fuel electrode.

Although an exemplary embodiment of the present disclosure has been described for illustrative purposes, those skilled in the art will appreciate that various modifications, additions, and substitutions are possible, without departing from the scope and spirit of the disclosure as disclosed in the accompanying claims.

What is claimed is:

1. A method for controlling a startup of a fuel cell system, the method comprising steps of:
   comparing a voltage, which is generated in a fuel cell stack when hydrogen is supplied to a fuel electrode of the fuel cell stack for a set period of time, with a first reference voltage;
   comparing a voltage of a unit cell of the fuel cell stack with a second reference voltage for load connection when the voltage generated in the fuel cell stack is higher than the first reference voltage;
   connecting a load to the fuel cell stack, when the voltage of the unit cell of the fuel cell stack is higher than the second reference voltage for load connection; and
   disconnecting, or not connecting, a connection between the fuel cell stack and the load, when the fuel cell system is operated under a predetermined specific condition.

2. The method according to claim 1, further comprising steps of:
   determining an amount of oxygen to be removed from the fuel electrode or a time needed to remove the oxygen from the fuel electrode when the voltage generated in the fuel cell stack is higher than the first reference voltage; and performing hydrogen supercharging with respect to the fuel electrode according to the amount of the oxygen to be removed or the time needed to remove the oxygen.

3. The method according to claim 2, wherein
the step of connecting the load is performed when the voltage, which is generated in the unit cell of the fuel cell stack through the hydrogen supercharging, is higher than the second reference voltage for load connection.

4. The method according to claim 2, wherein
the amount of the oxygen to be removed or the time needed to remove the oxygen is proportional to the voltage generated in the fuel cell stack.

5. The method according to claim 2, further comprising a step of:
opening an air cut valve connected to an air electrode of the fuel cell stack, the opening being performed before the step of performing the hydrogen supercharging.

6. The method according to claim 2, wherein
when the voltage generated in a unit cell of the fuel cell stack is lower than the second reference voltage for load connection, the step of connecting is not performed.

7. The method according to claim 6, further comprising a step of:
supplying an amount of the hydrogen larger than the amount of the hydrogen used in the step of performing the hydrogen supercharging to the fuel electrode of the fuel cell stack through a supercharging method, without performing the step of connecting the load.

8. The method according to claim 2, wherein the predetermined specific condition includes when a temperature of the fuel cell stack meets a cold starting condition after the performing of the hydrogen supercharging.

9. The method according to claim 8, further comprising a step of:
supplying an amount of the hydrogen larger than the amount of the hydrogen used in the step of performing the hydrogen supercharging to the fuel electrode of the fuel cell stack through a supercharging method, without performing the step of connecting the load.

10. The method according to claim 2, wherein the predetermined specific condition includes when a failure of a load connection device is detected and thus a load cannot be connected to the fuel cell stack.

11. The method according to claim 10, further comprising a step of:
supplying an amount of the hydrogen larger than the amount of the hydrogen used in the step of performing the hydrogen supercharging to the fuel electrode of the fuel cell stack through a supercharging method, without performing the step of connecting the load.

12. The method according to claim 2, wherein the predetermined specific condition includes when a supply pressure of the hydrogen to the fuel electrode is lower than a reference pressure.

13. The method according to claim 12, further comprising a step of:
supplying an amount of the hydrogen larger than the amount of the hydrogen used in the step of performing the hydrogen supercharging to the fuel electrode of the fuel cell stack through a supercharging method, without performing the step of connecting the load.

14. The method according to claim 2, further comprising steps of:
determining whether the oxygen supplied to the fuel electrode is completely removed through the hydrogen supercharging; and
stopping the hydrogen supercharging, releasing the connection of the load, and supplying air to an air electrode of the fuel cell stack, when the oxygen is completely removed.

15. The method according to claim 14, wherein
in the step of determining, the determination is made based on whether an amount of emissions from the fuel electrode exceeds the determined amount of oxygen to be removed or whether a time for which the hydrogen supercharging is performed exceeds the determined time needed to remove the oxygen.

16. The method according to claim 1, further comprising a step of:
comparing an elapsed time from a completion of last supply of the hydrogen to the fuel cell stack, with a reference time,
wherein the step of comparing the voltage generated in the fuel cell stack with the first reference voltage is performed when the elapsed time from the completion of the last supply of the hydrogen is longer than the reference time.

17. The method according to 16, further comprising a step of:
opening an air cut valve connected to an air electrode of the fuel cell stack and supplying hydrogen and air to the fuel cell stack, when the elapsed time from the completion of the last supply of the hydrogen is shorter than the reference time.

18. The method according to claim 16, wherein
the elapsed time from the completion of the last supply of the hydrogen is a time which is elapsed from turning-off of an ignition key of a fuel cell vehicle.

19. The method according to claim 16, wherein
the elapsed time from the completion of the last supply of the hydrogen is a time elapsed from the last supply of the hydrogen when the hydrogen is periodically supplied after turning-off of an ignition key of a fuel cell vehicle.

20. The method according to claim 1, further comprising steps of:
determining whether a temperature of the fuel cell stack meets a cold starting condition; and
supplying hydrogen and air to the fuel cell stack by opening an air cut valve connected to an air electrode of the fuel cell stack when the temperature meets the cold starting condition.

21. The method according to claim 1, further comprising a step of:
supplying air to the fuel cell stack by opening an air cut valve connected to an air electrode of the fuel cell stack, when the voltage generated in the fuel cell stack is lower than the first reference voltage.

22. The method according to claim 1, wherein
the comparing refers to a step of determining whether a minimum voltage among voltages generated in all unit cells of the fuel cell stack is higher than the second reference voltage for load connection.

* * * * *